US006797761B2

(12) United States Patent
Bendix et al.

(10) Patent No.: US 6,797,761 B2
(45) Date of Patent: Sep. 28, 2004

(54) AQUEOUS PRIMARY DISPERSIONS, METHOD FOR PREPARATION AND USE THEREOF

(75) Inventors: Maximilian Bendix, Oelde (DE); Heinz-Peter Rink, Münster (DE)

(73) Assignee: BASF Coatings AG, Munster (DE)

( * ) Notice: Subject to any disclaimer, the term of this patent is extended or adjusted under 35 U.S.C. 154(b) by 246 days.

(21) Appl. No.: 10/169,473

(22) PCT Filed: Feb. 1, 2001

(86) PCT No.: PCT/EP01/01084

§ 371 (c)(1),
(2), (4) Date: Jun. 28, 2002

(87) PCT Pub. No.: WO01/58963

PCT Pub. Date: Aug. 16, 2001

(65) Prior Publication Data

US 2003/0100673 A1 May 29, 2003

(30) Foreign Application Priority Data

Feb. 10, 2000 (DE) ......................... 100 05 819

(51) Int. Cl.[7] ............................. C08K 3/20; C08F 2/16
(52) U.S. Cl. .................. 524/457; 524/570; 524/571; 524/804; 526/210
(58) Field of Search ......................... 524/457, 570, 524/571, 804; 526/210

(56) References Cited

U.S. PATENT DOCUMENTS

| | | | | |
|---|---|---|---|---|
| 3,552,986 | A | 1/1971 | Bassemir | 117/12 |
| 3,577,476 | A | 5/1971 | Gurney | 260/668 |
| 4,085,168 | A | 4/1978 | Milkovich et al. | 260/886 |
| 4,413,036 | A | 11/1983 | Drexler et al. | 428/458 |
| 4,521,580 | A | 6/1985 | Turner et al. | 526/307.2 |
| 4,533,701 | A | 8/1985 | Kusumoto et al. | 525/370 |
| 4,636,545 | A | 1/1987 | König et al. | |
| 4,656,226 | A | 4/1987 | Hutchins et al. | 525/93 |
| 4,677,003 | A | 6/1987 | Redlich et al. | 427/373 |
| 5,047,454 | A | 9/1991 | Cowles et al. | 523/500 |
| 5,126,393 | A | 6/1992 | Blum et al. | 524/538 |
| 5,322,715 | A | 6/1994 | Jouck et al. | 427/409 |
| 5,385,996 | A | 1/1995 | Rizzardo et al. | 526/240 |
| 5,395,903 | A | 3/1995 | Charmot et al. | 526/220 |
| 5,516,559 | A | 5/1996 | Röckrath et al. | 427/407.1 |
| 5,521,229 | A | 5/1996 | Lu et al. | 522/40 |
| 5,565,508 | A | 10/1996 | Hoenel et al. | 523/414 |
| 5,601,880 | A | 2/1997 | Schwarte et al. | 427/407.1 |
| 5,670,557 | A | 9/1997 | Dietz et al. | 522/184 |
| 5,773,543 | A | 6/1998 | Rizzardo et al. | 526/215 |
| 5,830,927 | A | 11/1998 | Vanderhoff et al. | 522/81 |
| 5,830,928 | A | 11/1998 | Faler et al. | 523/502 |

(List continued on next page.)

FOREIGN PATENT DOCUMENTS

| | | | | |
|---|---|---|---|---|
| CA | 2004988 | 12/1989 | ............. | C08F/2/24 |
| CA | 2103595 | 1/1992 | ............. | C08F/2/38 |
| CA | 2086156 | 12/1992 | ......... | C09D/175/04 |
| CA | 2127919 | 7/1994 | ........... | C08L/57/00 |
| CA | 2181934 | 7/1996 | ......... | C08F/282/00 |
| CA | 2259559 | 7/1997 | ............. | C08F/8/34 |
| CA | 2355620 | 12/1999 | ......... | C08F/293/00 |
| DE | 3546594 | 12/1992 | ......... | C08F/212/06 |
| EP | 358221 | 9/1989 | ............. | C09D/5/44 |
| EP | 401 565 | 5/1990 | ............. | C09D/5/02 |
| EP | 498583 | 1/1992 | ............. | B01J/19/18 |
| EP | 732359 | 3/1996 | ............. | C08K/5/00 |
| EP | 755 946 | 7/1996 | ............. | C08F/2/22 |
| WO | WO9106535 | 5/1991 | ......... | C07C/409/16 |
| WO | WO92/13903 | 8/1992 | ............. | C08F/2/38 |
| WO | WO9222355 | 12/1992 | ........... | A63B/37/12 |
| WO | WO9322351 | 11/1993 | ............. | C08F/2/42 |
| WO | WO96/15157 | 5/1996 | ............. | C08F/2/38 |
| WO | WO97/49739 | 12/1997 | ......... | C08F/251/02 |
| WO | WO98/01478 | 1/1998 | ............. | C08F/2/38 |
| WO | WO98/37104 | 8/1998 | ............. | C08F/2/48 |
| WO | WO99/10413 | 3/1999 | ............. | C08J/3/00 |
| WO | WO99/15597 | 4/1999 | ......... | C09D/133/00 |
| WO | WO 02/064652 A1 | 8/2002 | | |
| WO | WO 02/064692 A1 | 8/2002 | | |

OTHER PUBLICATIONS

Derwent Accession No. 1999–502399, English Abstract for JP11217409, Aug. 16, 1999.
Derwent Accession No. 1996–094214, English Abstract for JP08003208, Jan. 9, 1996.
Derwent Accession No. 1986–152526, English Abstract for NIPPON, JP61085417, May 1, 1986.
English Abstract for, Dalibor, DE 3546594, filed Dec. 10, 1987.
English Abstract for Grutter, EP 358 221, filed Mar. 14, 1990.
English Abstract for Knoll, et al., EP 732 359, filed Sep. 18, 1996.
Abstract of JP 07–316242, Derwent Assession No. 1996–05619, Dec. 5, 1995.
Translation of WO 02/064692, U.S. application No. 10/250,694 filed on Jul. 3, 2003.
Translation of WO 02/064652, U.S. application No. 10/250,586 filed on Jul. 2, 2003.
BASF Coatings AG, U.S. application No. 10/018,703 filed Dec. 13, 2001, pp. 1–79.
English Translation for BASF Corporation, et al., USSN 10/239,938 Filed Sep. 26, 2002 IN–5622.

*Primary Examiner*—Kriellion A. Sanders

(57) ABSTRACT

Aqueous primary dispersions comprising dispersed and/or emulsified, solid and/or liquid polymer particles and/or dispersed solid core-shell particles having a diameter$\leq$500 nm, preparable by free-radical microemulsion or miniemulsion polymerization of at least one olefinically unsaturated monomer (A) in the presence of at least one polyhydroxy-functionalized cyclic and/or acyclic alkare having from 9 to 16 carbon atoms in the molecule, and their use in automotive OEM finishing and refinishing, in furniture coating and in industrial coating, including coil coating, container coating and the coating of electrical components.

39 Claims, No Drawings

U.S. PATENT DOCUMENTS

| | | | |
|---|---|---|---|
| 5,840,372 A | 11/1998 | Rink et al. | 427/407 |
| 5,854,353 A | 12/1998 | Knoll et al. | 525/314 |
| 5,857,998 A | 1/1999 | Barry | 604/96 |
| 5,859,112 A | 1/1999 | Overbeek et al. | 524/460 |
| 5,905,132 A | 5/1999 | Wegner et al. | 528/45 |
| 5,959,026 A | 9/1999 | Abusleme et al. | |
| 5,969,030 A | 10/1999 | Grandhee | 524/457 |
| 5,972,809 A | 10/1999 | Faler et al. | 442/103 |
| 5,990,221 A | 11/1999 | Dames et al. | 524/457 |
| 6,020,438 A | 2/2000 | Lubnin et al. | 525/317 |
| 6,100,350 A | 8/2000 | Wilczek et al. | 526/82 |
| 6,140,386 A | 10/2000 | Vanderhoff et al. | 522/78 |
| 6,160,049 A * | 12/2000 | Mathauer et al. | 524/804 |
| 6,162,886 A | 12/2000 | Bremer et al. | 526/318.42 |
| 6,221,949 B1 | 4/2001 | Gross et al. | 524/451 |
| 6,235,857 B1 | 5/2001 | Rizzardo et al. | 526/220 |
| 6,346,591 B1 | 2/2002 | Ohrbom et al. | 526/312 |
| 6,403,709 B2 | 6/2002 | Ramesh et al. | 525/95 |
| 6,462,139 B1 | 10/2002 | Das et al. | |
| 6,503,983 B1 * | 1/2003 | Morrison et al. | 524/804 |
| 6,506,836 B1 | 1/2003 | Bremser et al. | 525/64 |
| 6,512,026 B1 * | 1/2003 | Ott et al. | 523/409 |
| 6,566,476 B2 | 5/2003 | Ohrbom et al. | 526/312 |
| 6,670,043 B2 | 12/2003 | Barkac et al. | |

* cited by examiner

AQUEOUS PRIMARY DISPERSIONS, METHOD FOR PREPARATION AND USE THEREOF

This application is a National Phase Application of Patent Application PCT/EP01/01084 filed on 1 Feb. 2001.

The present invention relates to novel aqueous primary dispersions which comprise dispersed and/or emulsified, solid and/or liquid polymer particles and/or dispersed solid core-shell particles having a diameter ≦500 nm. The present invention further relates to a novel process for preparing the novel aqueous primary dispersions by means of free-radical microemulsion and miniemulsion polymerization. The present invention relates, furthermore, to the use of the novel aqueous primary dispersions for preparing novel coating materials, adhesives and sealing compounds. The present invention relates not least to the use of the novel coating materials, adhesives and sealing compounds in automotive OEM finishing and refinishing, furniture coating, industrial coating, including container coating, coil coating and the coating of electrical components.

Microemulsions and miniemulsions are dispersions comprising water, an oil phase and one or more surface-active substances and having droplet sizes of from 5 to 50 nm (microemulsions) or from 50 to 500 nm. Microemulsions are regarded as being thermodynamically stable, whereas the miniemulsions are regarded as metastable (cf. Emulsion Polymerization and Emulsion Polymers, Editors: P. A. Lovell and Mohamed S. El-Aasser, John Wiley and Sons, Chichester, N.Y., Weinheim, 1997, pages 700 et seq.; Mohamed S. El-Aasser, Advances in Emulsion Polymerization and Latex Technology, 30th Annual Short Course, Volume 3, Jun. 7–11, 1999, Emulsion Polymers Institute, Lehigh University, Bethlehem, Pa., USA). Both types of dispersions find broad application in the art: for example, in cleaning products, cosmetics or bodycare products. They may, however, also be used for polymerization reactions in place of the customary macroemulsions, in which droplet sizes>1000 nm are present.

The preparation of aqueous primary dispersions by means of free-radical miniemulsion polymerization is known, for example, from the international patent application WO 98/02466 or from German patents DE 196 28 143 A 1 and DE 196 28 142 A 2. In the case of these known processes, the monomers may be copolymerized in the presence of different low molecular mass, oligomeric or polymeric, hydrophobic substances, which are also referred to as costabilizers (cf. DE 196 28 142 A2). Furthermore, hydrophobic, organic auxiliaries of low solubility in water, such as plasticizers, enhancers of the tackiness of the resulting film, film forming auxiliaries, i.e., coalescents, or other, unspecified organic additives, may be incorporated into the monomer droplets of the miniemulsion (cf. DE 196 28 143 A1).

Moreover, aqueous coating materials based on aqueous primary dispersions which comprise solid core-shell particles and have been prepared by miniemulsion polymerization of monomers in the presence of hydrophobic polymers are known from patents EP 0 401 565 A1, WO 97/49739 or EP 0 755 946 A1.

Although the known aqueous primary dispersions and coating materials already have numerous advantageous properties, problems may still arise in connection with film formation, these problems being unable to be removed entirely through the use of customary and known coalescents in microemulsion and miniemulsion polymerization. The costabilizers commonly employed, as well, are unable to offer a satisfactory solution.

The subsequent incorporation of the coalescents into the aqueous primary dispersions may, moreover, also lead to coagulation of the dispersions, with the result that they can be used only with very great restrictions, if at all, for demanding applications, such as the production of decorative and/or protective coatings.

The use of polyhydroxy-functionalized cyclic and/or acyclic alkanes having from 9 to 16 carbon atoms in the molecule is not disclosed in the patents mentioned above.

Unsatisfactory film forming properties and the risk of coagulation, however, run counter to the widespread use of the known aqueous primary dispersions and of the coating materials prepared from them. The same applies to the corresponding adhesives and sealing compounds.

The patent application bearing the file reference DE 199 59 923.8, unpublished at the priority date of the present specification, describes the controlled free-radical microemulsion and miniemulsion polymerization of olefinically unsaturated monomers in the presence of crosslinking agents for the copolymers resulting from the monomers. The use of polyhydroxy-functionalized cyclic and/or acyclic alkanes having from 9 to 16 carbon atoms in the molecule is not addressed in said patent.

Polyhydroxy-functionalized cyclic and/or acyclic alkanes having from 9 to 16 carbon atoms in the molecule, such as the positionally isomeric diethyloctanediols, have already been used as reactive diluents for thermal curing in coating materials curable thermally or both thermally and with actinic radiation (cf. German patent application DE 198 09 643 A1, published before the priority date of the present specification), in architectural coating materials, as a reaction medium for the preparation of acrylic copolymers, or as a synthetic building block for the preparation of oligomers and polymers (cf. patent applications bearing the file references DE 198 50 243, 198 55 167.3, 199 24 674.2, 199 38 758.3, 199 40 855.6, or 199 45 574.0, all unpublished at the priority date of the present specification). The use of polyhydroxy-functionalized cyclic and/or acyclic alkanes having from 9 to 16 carbon atoms in the molecule in the microemulsion and miniemulsion polymerization of olefinically unsaturated monomers is neither described in the abovementioned patent nor addressed in the unpublished patent applications.

It is an object of the present invention to improve the film forming properties of the existing aqueous primary dispersions and of the coating materials, adhesives, and sealing compounds produced from them so that they may be employed more broadly than has been possible to date. Moreover, the relevant coating materials, adhesives and sealing compounds are to have a popping tendency which is reduced in comparison with the prior art. In particular, the coatings produced from them should have a higher degree of gloss, less haze, and a surface free from optically disruptive structures, as compared with the known coatings. The advantages of the existing aqueous primary dispersions and of the coating materials, adhesives and sealing compounds produced from them should nevertheless be retained in their entirety.

It is a further object of the present invention to find a novel process of microemulsion and miniemulsion polymerization of olefinically unsaturated monomers which operates simply to provide aqueous primary dispersions having an improved profile of properties, particularly improved film forming properties.

The invention accordingly provides the novel aqueous primary dispersions comprising dispersed and/or emulsified, solid and/or liquid polymer particles and/or dispersed solid core-shell particles having a diameter≦500 nm, preparable by free-radical microemulsion or miniemulsion polymerization of at least one olefinically unsaturated monomer (A) in the presence of at least one polyhydroxy-functionalized cyclic and/or acyclic alkane having from 9 to 16 carbon atoms in the molecule, which are referred to below as "primary dispersions of the invention".

The invention also provides the novel process for preparing aqueous primary dispersions comprising dispersed and/or emulsified, solid and/or liquid polymer particles and/or dispersed solid core-shell particles having a diameter≦500 nm, in which at least one olefinically unsaturated monomer (A) is subjected to free-radical (co)polymerization in a microemulsion or miniemulsion in the presence of at least one polyhydroxy-functionalized cyclic and/or acyclic alkane having from 9 to 16 carbon atoms in the molecule, and which is referred to below as "process of the invention".

Further subject matter of the invention will emerge from the description.

In the light of the prior art it was surprising and unforeseeable by the skilled worker that the object on which the present invention was based could be achieved through the primary dispersions of the invention and the process of the invention. In particular it was surprising that the polyhydroxy-functionalized alkanes for inventive use do not disrupt the course of the (co)polymerization and also do not lead to coagulation of the primary dispersions of the invention. In particular it was surprising that the process of the invention yields, as intended, the primary dispersions of the invention in a particularly simple manner without the occurrence of the above-described problems known from the prior art. The process of the invention may be varied in a surprisingly broad way in order to allow primary dispersions of the invention to be prepared in a batch procedure and used directly as thermally crosslinkable coating materials, adhesives and sealing compounds.

For the purposes of the present invention, the property of being hydrophilic is understood as the constitutional property of a molecule or functional group to penetrate into the aqueous phase or to remain therein. Accordingly, for the purposes of the present invention, the property of being hydrophobic is understood as the constitutional property of a molecule or functional group to exhibit exophilic behavior with respect to water; i.e., they display the tendency not to penetrate into water, or to depart the aqueous phase. For further details reference is made to Römpp Lexikon Lacke und Druckfarben, Georg Thieme Verlag, Stuttgart, N.Y., 1998, "Hydrophilicity", "Hydrophobicity", pages 294 and 295.

In accordance with the invention, the primary dispersions comprise dispersed and/or emulsified solid and/or liquid polymer particles and/or dispersed solid core-shell particles. The size of the polymer particles or of the dispersed core-shell particles is a direct result of the process of the invention described below. In this case the average particle diameter is less than 500 nm. It is preferably from 10 to 500 nm, more preferably from 50 to 400 nm, and with very particular preference from 100 to 350 nm.

The primary dispersions of the invention have an advantageously high solids content of, for example, more than 20% by weight, preferably more than 30% by weight. It is even possible to obtain solids contents of more than 40% by weight. The primary dispersions of the invention have a low viscosity even at high solids content, which is a further particular advantage of the primary dispersions of the invention and of the coating materials, adhesives and sealing compounds of the invention that are prepared from them.

The core-shell particles for use in accordance with the invention result from the graft copolymerization of organic solids and the monomers (A) for use in accordance with the invention, described below. Said organic solids are preferably hydrophobic polymers, as described, for example, in the patents EP 0 401 565 A 1, page 3, line 5 to page 4, line 50, WO 97/49739, page 4, line 19 to page 5, line 3, or EP 0 755 946 A 1, page 3, line 26 to page 5, line 38. These hydrophobic polymers may also be prepared by the process of the invention.

The primary dispersions of the invention may also have a bimodal particle size distribution in which from 0.1 to 80% by weight, in particular from 1.0 to 50% by weight, of the (co)polymers resulting from the monomers (A) have a particle size, determined using an analytical ultracentrifuge, of from 20 to 500 nm, in particular from 50 co 300 nm, and from 20 to 99.9% by weight, in particular from 50 to 99% by weight, of the copolymer have a particle size of from 200 to 1500 nm, in particular from 300 to 900 nm, said particle sizes differing by at least 50 nm, in particular by at least 100 nm, with very particular preference by at least 200 nm. Concerning the measurement method, reference is made for further details to lines 5 to 9 of page 6 of German patent application DE 196 28 142 A 1.

In accordance with the invention, the particles of at least one monomer (A) that are present in the primary dispersions of the invention are prepared in the presence of at least one polyhydroxy-functionalized cyclic and/or acyclic alkane having from 9 to 16 carbon atoms in the molecule.

The functionalized alkanes are derived from branched, cyclic or acyclic alkanes having from 9 to 16 carbon atoms, which in each case form the parent structure.

Examples of suitable alkanes of this kind having 9 carbon atoms are 2-methyloctane, 4-methyloctane, 2,3-dimethylheptane, 3,4-dimethylheptane, 2,6-dimethylheptane, 3,5-dimethylheptane, 2-methyl-4-ethylhexane or isopropylcyclohexane.

Examples of suitable alkanes of this kind having 10 carbon atoms are 4-ethyloctane, 2,3,4,5-tetramethylhexane, 2,3-diethylhexane or 1-methyl-2-n-propylcyclohexane.

Examples of suitable alkanes of this kind having 11 carbon atoms are 2,4,5,6-tetramethylheptane or 3-methyl-6-ethyloctane.

Examples of suitable alkanes of this kind having 12 carbon atoms are 4-methyl-7-ethylnonane, 4,5-diethyloctane, 1'-ethylbutylcyclohexane, 3,5-diethyloctane or 2,4-diethyloctane.

Examples of suitable alkanes of this kind having 13 carbon atoms are 3,4-dimethyl-5-ethylnonane or 4,6-dimethyl-5-ethylnonane.

An example of a suitable alkane of this kind having 14 carbon atoms is 3,4-dimethyl-7-ethyldecane.

Examples of suitable alkanes of this kind having 15 carbon atoms are 3,6-diethylundecane or 3,6-dimethyl-9-ethylundecane.

Examples of suitable alkanes of this kind having 16 carbon atoms are 3,7-diethyldodecane or 4-ethyl-6-isopropylundecane.

Of these parent structures, the alkanes having from 10 to 14, and especially 12, carbon atoms are particularly advantageous and are therefore used with preference. Of these, in turn, the octane derivatives are especially advantageous.

For the invention it is advantageous if the functionalized alkanes have a boiling point of more than 200° C., preferably 220° C., and in particular 240° C. They ought also to have a low rate of evaporation.

For the coating materials of the invention it is of advantage if the functionalized alkanes are acyclic.

The functionalized alkanes generally contain primary and/or secondary hydroxyl groups. For the coating materials of the invention it is of advantage if primary and secondary groups are present in one compound.

Especially advantageous coating materials of the invention are obtained if the diols are positionally isomeric dialkyloctanediols, especially positionally isomeric diethyloctanediols.

The positionally isomeric diethyloctanediols for inventive use contain a linear $C_8$ carbon chain.

With regard to the two ethyl groups, the $C_8$ carbon chain has the following substitution pattern: 2,3, 2,4, 2,5, 2,6, 2,7, 3,4, 3,5, 3,6 or 4,5. In accordance with the invention it is of advantage if the two ethyl groups are in positions 2 and 4, i.e., the compounds are 2,4-diethyloctanediols.

With regard to the two hydroxyl groups, the $C_8$ carbon chain has the following substitution pattern: 1,2, 1,3, 1,4, 1,5, 1,6, 1,7, 1,8, 2,3, 2,4, 2,5, 2,6, 2,7, 2,8, 3,4, 3,5, 3,6, 3,7, 3,8, 4,5, 4,6, 4,8, 5,6, 5,7, 5,8, 6,7, 6,8 or 7,8. In accordance with the invention it is of advantage if the two hydroxyl groups are in positions 1 and 5, i.e., the compounds are diethyloctane-1,5-diols.

The two substitution patterns are combined with one another arbitrarily, i.e., the diethyloctanediols for inventive use comprise 2,3-diethyloctane-1,2-, -1,3-, -1,4-, -1,5-, -1,6-, -1,7-, -1,8-, -2,3-, -2,4-, -2,5-, -2,6-, -2,7-, -2,8-, -3,4-, -3,5-, -3,6-, -3,7-, -3,8-, -4,5-, -4,6-, -4,7-, -4,8-, -5,6-, -5,7-, -5,8-, -6,7-, -6,8- or -7,8-diol, 2,4-diethyloctane-1,2-, -1,3-, -1,4-, -1,5-, -1,6-, -1,7-, -1,8-, -2,3-, -2,4-, -2,5-, -2,6-, -2,7-, -2,8-, -3,4-, -3,5-, -3,6-, -3,7-, -3,8-, -4,5-, -4,6-, -4,7-, -4,8-, -5,6-, -5,7-, -5,8-, -6,7-, -6,8- or -7,8-diol, 2,5-diethyloctane-1,2-, -1,3-, -1,4-, -1,5-, -1,6-, -1,7-, -1,8-, -2,3-, -2,4-, -2,5-, -2,6-, -2,7-, -2,8-, -3,4-, -3,5-, -3,6-, -3,7-, -3,8-, -4,5-, -4,6-, -4,7-, -4,8-, -5,6-, -5,7-, -5,8-, -6,7-, -6,8- or -7,8-diol, 2,6-diethyloctane-1,2-, -1,3-, -1,4-, -1,5-, -1,6-, -1,7-, -1,8-, -2,3-, -2,4-, -2,5-, -2,6-, -2,7-, -2,8-, -3,4-, -3,5-, -3,6-, -3,7-, -3,8-, -4,5-, -4,6-, -4,7-, -4,8-, -5,6-, -5,7-, -5,8-, -6,7-, -6,8- or -7,8-diol, 2,7-diethyloctane-1,2-, -1,3-, -1,4-, -1,5-, -1,6-, -1,7-, -1,8-, -2,3-, -2,4-, -2,5-, -2,6-, -2,7-, -2,8-, -3,4-, -3,5-, -3,6-, -3,7-, -3,8-, -4,5-, -4,6-, -4,7-, -4,8-, -5,6-, -5,7-, -5,8-, -6,7-, -6,8- or -7,8-diol, 3,4-diethyloctane-1,2-, -1,3-, -1,4-, -1,5-, -1,6-, -1,7-, -1,8-, -2,3-, -2,4-, -2,5-, -2,6-, -2,7-, -2,8-, -3,4-, -3,5-, -3,6-, -3,7-, -3,8-, -4,5-, -4,6-, -4,7-, -4,8-, -5,6-, -5,7-, -5,8-, -6,7-, -6,8- or -7,8-diol, 3,5-diethyloctane-1,2-, -1,3-, -1,4-, -1,5-, -1,6-, -1,7-, -1,8-, -2,3-, -2,4-, -2,5-, -2,6-, -2,7-, -2,8-, -3,4-, -3,5-, -3,6-, -3,7-, -3,8-, -4,5-, -4,6-, -4,7-, -4,8-, -5,6-, -5,7-, -5,8-, -6,7-, -6,8- or -7,8-diol, 3,6-diethyloctane-1,2-, -1,3-, -1,4-, -1,5-, -1,6-, -1,7-, -1,8-, -2,3-, -2,4-, -2,5-, -2,6-, -2,7-, -2,8-, -3,4-, -3,5-, -3,6-, -3,7-, -3,8-, -4,5-, -4,6-, -4,7-, -4,8-, -5,6-, -5,7-, -5,8-, -6,7-, -6,8- or -7,8-diol, or 4,5-diethyloctane-1,2-, -1,3-, -1,4-, -1,5-, -1,6-, -1,7-, -1,8-, -2,3-, -2,4-, -2,5-, -2,6-, -2,7-, -2,8-, -3,4-, -3,5-, -3,6-, -3,7-, -3,8-, -4,5-, -4,6-, -4,7-, -4,8-, -5,6-, -5,7-, -5,8-, -6,7-, -6,8- or -7,8-diol.

The positionally isomeric diethyloctanediols for inventive use may be used as individual compounds or as mixtures of two or more diethyloctanediols.

Very particular advantages result from the use of 2,4-diethyloctane-1,5-diol.

The positionally isomeric diethyloctanediols used with preference in accordance with the invention are compounds which are known per se and can be prepared by means of customary and known synthesis methods of organic chemistry such as base-catalyzed aldol condensation, or are obtained as byproducts of large-scale chemical syntheses such as the preparation of 2-ethylhexanol.

The amount of functionalized alkanes employed in preparing the primary dispersions of the invention may vary very widely and is guided by the requirements of the case in hand. In other words, the main upper limit on the amount is the consideration that the formation of the microemulsion or miniemulsion must not be hindered and/or its stability reduced, and/or the (co)polymerization of the monomers (A) must not be adversely affected. At the bottom, the amount is limited by the consideration that it is necessary to use an amount of functionalized alkanes which allows the technical effects of the invention to be reliably obtained. Based on the total amount of the primary dispersion of the invention in question, the functionalized alkanes are used in an amount of preferably from 0.1 to 20%, more preferably from 0.2 to 18%, with particular preference from 0.3 to 15%, with very particular preference from 0.4 to 13%, and in particular from 0.5 to 10% by weight.

The essential starting compound for the primary dispersions and for the process of the invention is at least one olefinically unsaturated monomer (A).

In this context it is preferred to use at least one monomer (A) comprising reactive functional groups (a) which are able to enter into thermally initiated crosslinking reactions with groups (a) of their own kind or with complementary reactive functional groups (b). These groups (a) or (a) and (b) may be present in the (co)polymers resulting from the monomers (A), said (co)polymers then having self-crosslinking properties. Accordingly, the corresponding primary dispersions of the invention and the coating materials, adhesives and sealing compounds of the invention that are prepared from them are also self-crosslinking.

Alternatively, the complementary reactive functional groups (b) may be present in the crosslinking agents described below, which are added to the primary dispersions of the invention before, during and/or after their preparation. The corresponding primary dispersions of the invention and the coating materials, adhesives and sealing compounds of the invention that are prepared from them are accordingly externally crosslinking.

Regarding the terms "self-crosslinking" and "externally crosslinking", refer for further details to Römpp Lexikon Lacke und Druckfarben, Georg Thieme Verlag, Stuttgart, N.Y., 1998, "Curing", pages 274 to 276.

Examples of suitable complementary reactive functional groups (a) and (b) for use in accordance with the invention are collated in the overview below. In the overview, the variable R is an acyclic or cyclic aliphatic radical, an aromatic radical and/or an aromatic-aliphatic (araliphatic) radical; the variables R' and R" are identical or different aliphatic radicals or are linked to one another to form an aliphatic or heteroaliphatic ring.

Overview: Examples of Complementary Functional Groups (a) and (b)

| Monomer (A) and crosslinking agent or Crosslinking agent and monomer (A) | |
|---|---|
| —SH | —C(O)—OH |
| —NH$_2$ | —C(O)—O—C(O)— |
| —OH | —NCO |
| —O—(CO)—NH—(CO)—NH$_2$ | —NH—C(O)—OR |
| —O—(CO)—NH$_2$ | —CH$_2$—OH |
| >NH | —CH$_2$—O—R |
|  | —NH—CH$_2$—OH |
|  | —NH—CH$_2$—O—R |
|  | —N(—CH$_2$—O—R)$_2$ |
|  | —NH—C(O)—CH(—C(O)OR)$_2$ |
|  | —NH—C(O)—CH(—C(O)OR)(—C(O)—R) |
|  | —NH—C(O)—NR'R" |
|  | =Si(OR)$_2$ |
|  | 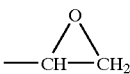 |
| —C(O)—OH | 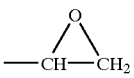 |

The selection of the respective complementary groups (a) or (a) and (b) is guided on the one hand by the consideration that, during the storage of primary dispersions of the invention, these groups must not enter into any unwanted reactions and/or, if appropriate, must not inhibit or disrupt additional curing with actinic radiation, and on the other hand by the temperature range within which crosslinking is to take place.

In the case of the coating materials of the invention, it is preferred to use crosslinking temperatures of from room temperature to 180° C. For this reason it is preferred to use monomers (A) having thio, hydroxyl, methylol, methylol ether, N-methylol or N-alkoxymethylamino, imino, carbamate, allophanate and/or carboxyl groups, in particular amino, alkoxymethylamino or hydroxyl groups, especially hydroxyl groups, on the one hand, and crosslinking agents containing anhydride, carboxyl, epoxy, blocked isocyanate, urethane, methylol, methylol ether, N-methylol or N-alkoxymethylamino, siloxane, amino, hydroxyl and/or beta-hydroxyalkylamide groups, but especially blocked isocyanate, urethane or methylol ether groups, on the other. For the preparation of self-crosslinking primary dispersions of the invention it is preferred to use methylol, methylol ether, N-methylol or N-alkoxymethylamino groups.

Where particularly reactive complementary groups (a) or (b), such as isocyanate groups, are used, the constituents comprising them, preferably the crosslinking agents, are not added to the primary dispersions of the invention until shortly before the use of said dispersions to prepare the corresponding coating materials, adhesives and sealing compounds of the invention. These coating materials, adhesives and sealing compounds of the invention are referred to by those in the art as two-component or multicomponent systems.

Where less reactive complementary groups (a) or (b) are used, the constituents comprising them are added preferably before the preparation or during the preparation to the primary dispersions of the invention, so that they are present from the outset in the coating materials, adhesives and sealing compounds of the invention that are prepared from them. These coating materials, adhesives and sealing compounds of the invention are referred to by those in the art as one-component systems.

Examples of Suitable Monomers (A) are a1) substantially acid-group-free (meth)acrylic esters such as (meth)acrylic alkyl or cycloalkyl esters having up to 20 carbon atoms in the alkyl radical, especially methyl, ethyl, propyl, n-butyl, sec-butyl, tert-butyl, hexyl, ethylhexyl, stearyl and lauryl acrylate or methacrylate; cycloaliphatic (meth)acrylic esters, especially cyclohexyl, isobornyl, dicyclopentadienyl, octahydro-4,7-methano-1H-indenemethanol acrylate or tert-butylcyclohexyl (meth)acrylate; (meth)acrylic oxaalkyl esters or oxacycloalkyl esters such as ethyltriglycol (meth)acrylate and methoxy-oligoglycol (meth)acrylate having a molecular weight Mn of preferably 550, or other ethoxylated and/or propoxylated hydroxyl-free (meth)acrylic acid derivatives. These may contain minor amounts of (meth)acrylic alkyl or cycloalkyl esters of higher functionality, such as the di(meth)acrylates of ethylene glycol, propylene glycol, diethylene glycol, dipropylene glycol, butylene glycol, 1,5-pentanediol, 1,6-hexanediol, octahydro-4,7-methano-1H-indenedimethanol or 1,2-, 1,3- or 1,4-cyclohexanediol; trimethylolpropane di- or tri(meth)acrylate; or pentaerythritol di-, tri- or tetra(meth)acrylate. For the purposes of the present invention, minor amounts of monomers of higher functionality in this case are to be understood as amounts which do not lead to crosslinking or gelling of the copolymers (A).

a2) Monomers which carry per molecule at least one hydroxyl, amino, alkoxymethylamino or imino group, and are essentially free from acid groups, such as hydroxyalkyl esters of acrylic acid, methacrylic acid or another alpha,beta-olefinically unsaturated carboxylic acid, which derive from an alkylene glycol esterified with the acid, or which are obtainable by reacting the alpha,beta-olefinically unsaturated carboxylic acid with an alkylene oxide, especially hydroxyalkyl esters of acrylic acid, methacrylic acid, ethacrylic acid, crotonic acid, maleic acid, fumaric acid or itaconic acid in which the hydroxyalkyl group contains up to 20 carbon atoms, such as 2-hydroxyethyl, 2-hydroxypropyl, 3-hydroxypropyl, 3-hydroxybutyl, 4-hydroxybutyl acrylate, methacrylate, ethacrylate, crotonate, maleate, fumarate or itaconate; or hydroxycycloalkyl esters such as 1,4-bis(hydroxymethyl)cyclohexane, octahydro-4,7-methano-1H-indenedimethanol or methylpropanediol monoacrylate, monomethacrylate, monoethacrylate, monocrotonate, monomaleate, monofumarate or monoitaconate; or reaction products of cyclic esters, such as epsilon-caprolactone, for example, and these hydroxyalkyl or hydroxycycloalkyl esters; or olefinically unsaturated alcohols such as allyl alcohol or polyols such as trimethylolpropane monoallyl or diallyl ether or pentaerythritol monoallyl, diallyl or triallyl ether (as far as these monomers (a2) of higher functionality are concerned, the comments made above relating to the monomers (a1) of higher functionality apply analogously); N,N-dimethylaminoethyl acrylate, N,N-diethylaminoethyl methacrylate, allylamine or N-methyliminoethyl acrylate or N,N-di(methoxymethyl)aminoethyl acrylate and methacrylate or N,N-di(butoxymethyl)aminopropyl acrylate and methacrylate;

a3) monomers which carry per molecule at least one acid group which can be converted to the corresponding acid anion group, such as acrylic acid, methacrylic acid, ethacrylic acid, crotonic acid, maleic acid, fumaric acid or itaconic acid; olefinically unsaturated sulfonic or phosphonic acids or their partial esters; or mono(meth)acryloyloxyethyl maleate, succinate or phthalate. For the purposes of the present invention the monomers (a3) are not used as the sole monomers (A) but are always used in conjunction with other monomers (A) and, moreover, in amounts so small that the monomers (a3) do not polymerize outside the droplets of the miniemulsion.

a4) Vinyl esters of alpha-branched monocarboxylic acids having 5 to 18 carbon atoms in the molecule. The branched monocarboxylic acids can be obtained by reacting formic acid or carbon monoxide and water with olefins in the presence of a liquid, strongly acidic catalyst; the olefins may be cracking products of paraffinic hydrocarbons, such as mineral oil fractions, and may comprise both branched and straight-chain acyclic and/or cycloaliphatic olefins. The reaction of such olefins with formic acid or, respectively, with carbon monoxide and water produces a mixture of carboxylic acids in which the carboxyl groups are located predominantly on a quaternary carbon atom. Examples of other olefinic starting materials are propylene trimer, propylene tetramer and diisobutylene. Alternatively, the vinyl esters (a4) may be prepared in conventional manner from the acids, by reacting, for example, the acid with acetylene. Particular preference, owing to their ready availability, is given to using vinyl esters of saturated aliphatic monocarboxylic acids having 9 to 11 carbon atoms that are branched on the alpha carbon atom, especially Versatic® acids (cf. Römpp, op. cit., "Versatic® acids", pp. 605–606).

a5) Reaction products of acrylic acid and/or methacrylic acid with the glycidyl ester of an alpha-branched monocarboxylic acid having 5 to 18 carbon atoms per molecule, in particular a Versatic® acid, or, instead of the reaction product, an equivalent amount of acrylic and/or methacrylic acid which is then reacted during or after the polymerization reaction with the glycidyl ester of an alpha-branched monocarboxylic acid having 5 to 18 carbon atoms per molecule, especially a Versatic® acid.

a6) Cyclic and/or acyclic olefins such as ethylene, propylene, 1-butene, 1-pentene, 1-hexene, cyclohexene, cyclopentene, norbornene, butadiene, isoprene, cyclopentadiene and/or dicyclopentadiene.

a7) (Meth)acrylamides such as (meth)acrylamide, N-methyl-, N,N-dimethyl-, N-ethyl-, N,N-diethyl-, N-propyl-, N,N-dipropyl-, N-butyl-, N,N-dibutyl-, N-cyclohexyl-, N,N-cyclohexylmethyl- and/or N-methylol-, N,N-dimethylol-, N-methoxymethyl-, N,N-di(methoxymethyl)-, N-ethoxymethyl- and/or N,N-di(ethoxyethyl)-(meth)acrylamide;

a8) monomers containing epoxide groups, such as the glycidyl ester of acrylic acid, methacrylic acid, ethacrylic acid, crotonic acid, maleic acid, fumaric acid and/or itaconic acid.

a9) Vinylaromatic hydrocarbons such as styrene, alpha-alkylstyrenes, especially alpha-methylstyrene, and/or vinyltoluene; vinylbenzoic acid (all isomers), N,N-diethylaminostyrene (all isomers), alpha-methylvinylbenzoic acid (all isomers), N,N-diethylamino-alpha-methylstyrene (all isomers) and/or p-vinylbenzenesulfonic acid.

a10) Nitriles such as acrylonitrile and/or methacrylonitrile.

a11) Vinyl compounds, especially vinyl halides and/or vinylidene dihalides such as vinyl chloride, vinyl fluoride, vinylidene dichloride or vinylidene difluoride; N-vinylamides such as vinyl-N-methylformamide, N-vinylcaprolactam, 1-vinylimidazole or N-vinylpyrrolidone; vinyl ethers such as ethyl vinyl ether, n-propyl vinyl ether, isopropyl vinyl ether, n-butyl vinyl ether, isobutyl vinyl ether and/or vinyl cyclohexyl ether; and/or vinyl esters such as vinyl acetate, vinyl propionate, vinyl butyrate, vinyl pivalate and/or the vinyl ester of 2-methyl-2-ethylheptanoic acid.

a12) Allyl compounds, especially allyl ethers and allyl esters such as allyl methyl, ethyl, propyl or butyl ether or allyl acetate, propionate or butyrate.

a13) Polysiloxane macromonomers having a number-average molecular weight Mn of from 1000 to 40,000 and having on average from 0.5 to 2.5 ethylenically unsaturated double bonds per molecule; especially polysiloxane macromonomers having a number-average molecular weight Mn of from 2000 to 20,000, with particular preference from 2500 to 10,000 and, in particular, from 3000 to 7000 and having on average from 0.5 to 2.5, preferably from 0.5 to 1.5, ethylenically unsaturated double bonds per molecule, as are described in DE 38 07 571 A 1 on pages 5 to 7, in DE 37 06 095 A 1 in columns 3 to 7, in EP 0 358 153 B 1 on pages 3 to 6, in U.S. Pat. No. 4,754,014 A 1 in columns 5 to 9, in DE 44 21 823 A 1 or in the international patent application WO 92/22615 on page 12, line 18 to page 18, line 10.

a14) Acryloxysilane-containing vinyl monomers, preparable by reacting hydroxy-functional silanes with epichlorohydrin and then reacting the reaction product with (meth)acrylic acid and/or hydroxyalkyl and/or hydroxycycloalkyl esters of (meth)acrylic acid (cf. monomers a2).

Further examples of suitable monomers (A) are disclosed in German patent application DE 196 28 142 A 1, page 2, line 50 to page 3, line 7.

Basically, each of the abovementioned monomers (a1) to (a14), with the exception of the monomer (a3), can be polymerized alone. In accordance with the invention, however, it is advantageous to use at least two monomers (A), since by this means it is possible to vary the profile of properties of the resulting copolymers very widely, in a particularly advantageous manner, and to tailor said profile of properties to the particular intended use of the primary dispersions of the invention.

Preferably, the monomers (A) are selected so as to give (meth)acrylate copolymers whose profile of properties is determined primarily by the (meth)acrylates described above. In that case it is preferred as comonomer (A) to use vinylaromatic hydrocarbons (a9), especially styrene.

Particularly advantageous primary dispersions, coating materials and sealing compounds of the invention result if the primary dispersions of the invention are prepared using, in addition, at least one olefinically unsaturated monomer (B) which is different than the monomers (A) described above.

For the process of the invention the use of (B) as well has the further key advantage that the process can be carried out batchwise without any overheating of the reaction mixture or even reactor runaway.

The olefinically unsaturated monomer (B) for use in accordance with the invention has the general formula I:

$$R^1R^2C=CR^3R^4 \qquad (I).$$

in the general formula I, the radicals $R^1$, $R^2$, $R^3$ and $R^4$ independently of one another are in each case hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^1$, $R^2$, $R^3$ and $R^4$ are substituted or unsubstituted aryl, arylalkyl or arylcycloalkyl radicals, especially substituted or unsubstituted aryl radicals.

Examples of suitable alkyl radicals are methyl, ethyl, propyl, isopropyl, n-butyl, isobutyl, tert-butyl, amyl, hexyl or 2-ethylhexyl.

Examples of suitable cycloalkyl radicals are cyclobutyl, cyclopentyl or cyclohexyl.

Examples of suitable alkylcycloalkyl radicals are methylenecyclohexane, ethylenecyclohexane or propane-1,3-diylcyclohexane.

Examples of suitable cycloalkylalkyl radicals are 2-, 3- or 4-methyl-, -ethyl-, -propyl- or -butylcyclohex-1-yl.

Examples of suitable aryl radicals are phenyl, naphthyl or -biphenylyl, preferably phenyl and naphthyl, and especially phenyl.

Examples of suitable alkylaryl radicals are benzyl or ethylene- or propane-1,3-diylbenzene.

Examples of suitable cycloalkylaryl radicals are 2-, 3- or 4-phenylcyclohex-1-yl.

Examples of suitable arylalkyl radicals are 2-, 3- or 4-methyl-, -ethyl-, -propyl- or -butylphen-1-yl.

Examples of suitable arylcycloalkyl radicals are 2-, 3- or 4-cyclohexylphen-1-yl.

The radicals $R^1$, $R^2$, $R^3$ and $R^4$ described above may be substituted. For this purpose electron-withdrawing or electron-donating atoms or organic radicals may be used.

Examples of suitable substituents are halogen atoms, especially chloro and fluoro, nitrile groups, nitro groups, partially or fully halogenated, especially chlorinated and/or fluorinated, alkyl, cycloalkyl, alkylcycloalkyl, cycloalkylalkyl, aryl, alkylaryl, cycloalkylaryl, arylalkyl and arylcycloalkyl radicals, including those exemplified above, especially tert-butyl; aryloxy, alkyloxy and cycloalkyloxy radicals, especially phenoxy, naphthoxy, methoxy, ethoxy, propoxy, butyloxy or cyclohexyloxy; arylthio, alkylthio and cycloalkylthio radicals, especially phenylthio, naphthylthio, methylthio, ethylthio, propylthio, butylthio or cyclohexylthio; hydroxyl groups; and/or primary, secondary and/or tertiary amino groups, especially amino, N-methylamino, N-ethylamino, N-propylamino, N-phenylamino, N-cyclohexylamino, N,N-dimethylamino, N,N-diethylamino, N,N-dipropylamino, N,N-diphenylamino, N,N-dicyclohexylamino, N-cyclohexyl-N-methylamino or N-ethyl-N-methylamino.

Examples of monomers (B) used with particular preference are diphenylethylene, dinapthaleneethylene, cis- or trans-stilbene, vinylidenebis(4-N,N-dimethylaminobenzene), vinylidenebis (4-aminobenzene) or vinylidenebis(4-nitrobenzene).

The monomers (B) may be used individually or as a mixture of at least two monomers (B). Where used, the fraction of the monomers (B) in the monomer mixture (A) and (B), based in each case on the mixture, is preferably from 0.01 to 10%, more preferably from 0.1 to 9.0%, with particular preference from 0.15 to 8.0%, with very particular preference from 0.2 to 7.0%, and in particular from 0.25 to 6.0% by weight.

With regard to the reaction regime and to the properties of the resulting copolymers, especially the acrylic copolymers, diphenylethylene is especially advantageous and is therefore used with very particular preference in accordance with the invention.

The monomers (A) and, where appropriate, (B) to be used in accordance with the invention are reacted with one another to form copolymers in the presence of at least one water-soluble and/or oil-soluble initiator which forms free radicals. Examples of initiators which can be used are: dialkyl peroxides, such as di-tert-butyl peroxide or dicumyl peroxide; hydroperoxides, such as cumene hydroperoxide or tert-butyl hydroperoxide; peresters, such as tert-butyl perbenzoate, tert-butyl perpivalate, tert-butyl per-3,5,5-trimethylhexanoate or tert-butyl per-2-ethylhexanoate; peroxodicarbonates, such as bis(4-tert-butylcyclohexyl) peroxydicarbonate; potassium, sodium or ammonium peroxodisulfate; azo initiators, examples being azodinitriles such as azobisisobutyronitrile; C—C-cleaving initiators such as benzpinacol silyl ethers; or a combination of a nonoxidizing initiator with hydrogen peroxide. Further examples of suitable initiators are described in German patent application DE 196 28 142 A1, page 3, line 49 to page 4, line 6. Combinations of these initiators may also be used.

It is preferred to add comparatively large amounts of free-radical initiator, the proportion of the initiator in the reaction mixture being, based in each case on the overall amount of the monomers (A) and of the initiator, with particular preference from 0.2 to 20% by weight, with very particular preference from 0.5 to 15% by weight, and in particular from 1.0 to 13% by weight.

Especially advantageous primary dispersions, coating materials and sealing compounds of the invention are obtained if the monomers (A) and, where appropriate, (B) are (co)polymerized in the presence of at least one hydrophobic crosslinking agent. The hydrophobic crosslinking agents preferably contain the above-described reactive functional groups (a) or (b) which enter into crosslinking reactions with the complementary reactive functional groups (a) or (b) that are present in the resultant (co)polymers. The resulting primary dispersions of the invention comprise the crosslinking agents in particularly effective distribution, and so the crosslinking reactions proceed in a particularly satisfactory way, with the consequence that less crosslinking agent may be used than in the corresponding dispersions prepared by prior art processes. Moreover, the resultant primary dispersions of the invention may be used directly as coating materials, adhesives and sealing compounds of the invention.

Examples of particularly suitable hydrophobic crosslinking agents are blocked polyisocyanates, tris-(alkoxycarbonylamino)triazines or fully etherified amino resins.

Examples of suitable blocking agents for preparing the blocked polyisocyanates are the blocking agents known from U.S. Pat. No. 4,444,954:

i) phenols such as phenol, cresol, xylenol, nitrophenol, chlorophenol, ethylphenol, t-butyl-phenol, hydroxybenzoic acid, esters of these acids, or 2,5-di-tert-butyl-4-hydroxytoluene;

ii) lactams, such as ε-caprolactam, δ-valerolactam, γ-butyrolactam or β-propiolactam;

iii) active methylenic compounds, such as diethyl malonate, dimethyl malonate, ethyl or methyl acetoacetate, or acetylacetone;

iv) alcohols such as methanol, ethanol, n-propanol, isopropanol, n-butanol, isobutanol, t-butanol, n-amyl alcohol, t-amyl alcohol, lauryl alcohol, ethylene glycol monomethyl ether, ethylene glycol monoethyl ether, ethylene glycol monopropyl ether, ethylene glycol monobutyl ether, diethylene glycol monomethyl ether, diethylene glycol monoethyl ether, propylene glycol monomethyl ether, methoxymethanol, glycolic acid, glycolic esters, lactic acid, lactic esters, methylolurea, methylolmelamine, diacetone alcohol, ethylenechlorohydrin, ethylenebromohydrin, 1,3-dichloro-2-propanol, 1,4-cyclohexyldimethanol or acetocyanohydrin;

v) mercaptans such as butyl mercaptan, hexyl mercaptan, t-butyl mercaptan, t-dodecyl mercaptan, 2-mercaptobenzothiazole, thiophenol, methylthiophenol or ethylthiophenol;

vi) acid amides such as acetoanilide, acetoanisidine amide, acrylamide, methacrylamide, acetamide, stearamide or benzamide;

vii) imides such as succinimide, phthalimide or maleimide;

viii) amines such as diphenylamine, phenylnaphthylamine, xylidine, N-phenylxylidine, carbazole, aniline, naphthylamine, butylamine, dibutylamine or butylphenylamine;

ix) imidazoles such as imidazole or 2-ethylimidazole;

x) ureas such as urea, thiourea, ethyleneurea, ethylenethiourea or 1,3-diphenylurea;

xi) carbamates such as phenyl N-phenylcarbamate or 2-oxazolidone;

xii) imines such as ethyleneimine;

xiii) oximes such as acetone oxime, formaldoxime, acetaldoxime, acetoxime, methyl ethyl ketoxime, diisobutyl ketoxime, diacetyl monoxime, benzophenone oxime or chlorohexanone oximes;

xiv) salts of sulfurous acid such as sodium bisulfite or potassium bisulfite;

xv) hydroxamic esters such as benzyl methacrylohydroxamate (BMH) or allyl methacrylohydroxamate; or xvi) substituted pyrazoles, especially dimethylpyrazole, or triazoles; and also xvii) mixtures of these blocking agents, especially dimethylpyrazole and triazoles, malonic esters and acetoacetic esters or dimethylpyrazole and succinimide.

Examples of suitable organic polyisocyanates for blocking are in particular the so-called paint polyisocyanates having isocyanate groups attached to aliphatic, cycloaliphatic, araliphatic and/or aromatic structures. Preference is given to polyisocyanates having from 2 to 5 isocyanate groups per molecule and having viscosities of from 100 to 10,000, preferably from 100 to 5000.

Examples of suitable polyisocyanates for blocking are polyisocyanates containing isocyanurate, biuret, allophanate, iminooxadiazinedione, urethane, urea and/or uretdione groups. Polyisocyanates containing urethane groups, for example, are prepared by reacting some of the isocyanate groups with polyols, such as trimethylolpropane and glycerol, for example.

For preparing the polyisocyanates for blocking preference is given to the use of aliphatic or cycloaliphatic diisocyanates, especially hexamethylene diisocyanate, isophorone diisocyanate, dicyclohexylmethane 2,4'-diisocyanate, dicyclohexylmethane 4,4'-diisocyanate, diisocyanates derived from dimeric fatty acids, as marketed under the commercial designation DDI 1410 by Henkel and described in patents WO 97/49745 and WO 97/49747, especially 2-heptyl-3,4-bis(9-isocyanatononyl)-1-pentylcyclohexane; or 1,2-, 1,4- or 1,3-bis (isocyanatomethyl)cyclohexane, 1,2-, 1,4- or 1,3-bis(2-isocyanatoeth-1-yl)cyclohexane, 1,3-bis(3-isocyanatoprop-1-yl)cyclohexane or 1,2-, 1,4- or 1,3-bis(4-isocyanatobut-1-yl)cyclohexane, 1,8-diisocyanato-4-isocyanatomethyloctane, 1,7-diisocyanato-4-isocyanatomethylheptane or 1-isocyanato-2-(3-isocyanatopropyl)cyclohexane, or mixtures of these.

The diisocyanates may likewise be used per se for the preparation of blocked diisocyanates. Preferably, however, they are used not alone but rather in a mixture with the polyisocyanates.

Very particular preference is given to the use of mixtures of polyisocyanates containing uretdione and/or isocyanurate groups and/or allophanate groups based on hexamethylene diisocyanate, as are formed by catalytic oligomerization of hexamethylene diisocyanate using appropriate catalysts.

Examples of particularly suitable fully etherified amino resins are melamine resins, guanamine resins or urea resins. In this context it is possible to use any amino resin that is suitable for clearcoats, or a mixture of such amino resins. For further details refer to Römpp Lexikon Lacke und Druckfarben, Georg Thieme Verlag, 1998, page 29, "Amino resins", and the textbook "Lackadditive" by Johan Bieleman, Wiley-VCH, Weinheim, N.Y., 1998, pages 242 ff., or to the book "Paints, Coatings and Solvents", second completely revised edition, editors: D. Stoye and W. Freitag, Wiley-VCH, Weinheim, N.Y., 1998, pages 80 ff. Also suitable are the customary and known amino resins some of whose methylol and/or methoxymethyl groups have been defunctionalized by means of carbamate or allophanate groups. Crosslinking agents of this kind are described in the patents U.S. Pat. No. 4,710,542 A 1 and EP 245 700 B 1 and also in the article by B. Singh and coworkers "Carbamylmethylated Melamines, Novel Crosslinkers for the Coatings Industry" in Advanced Organic Coatings Science and Technology Series, 1991, Volume 13, pages 193 to 207.

The particularly suitable tris(alkoxycarbonylamino) triazines have the following formula:

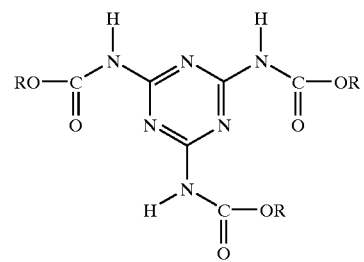

Examples of particularly suitable tris(alkoxycarbonylamino)triazines are described in the patents U.S. Pat. No. 4,939,213 A 1, U.S. Pat. No. 5,084,541 A 1 or EP 0 624 577 A 1. Use is made in particular of the tris(methoxy-, tris(butoxy- and/or tris(2-ethylhexoxycarbonylamino) triazines.

The methyl butyl mixed esters, the butyl 2-ethylhexyl mixed esters and the butyl esters are of advantage. They have the advantage over the simple methyl ester of better solubility in polymer melts and also have a lower tendency to crystallize out.

Of the crosslinking agents described above, the blocked polyisocyanates offer particular advantages and are therefore used with very particular preference in accordance with the invention.

In the process of the invention, the ratio of the monomers (A) comprising complementary reactive functional groups (a) or (b) to the crosslinking agents may vary very widely. In accordance with the invention it is of advantage if the molar ratio of complementary reactive functional groups (a) or (b) in (A) to complementary reactive functional groups (a) or (b) in the crosslinking agents is from 5.0:1.0 to 1.0:5.0, preferably from 4.0:1.0 to 1.0:4.0, with particular preference from 3.0:1.0 to 1.0:3.0, and in particular from 2.0:1 to 1:2.0. Particular advantages result if the molar ratio is approximately or precisely 1.0:1.0.

In addition to the hydrophobic crosslinking agents described above, the (co)polymerization of the monomers (A) and, where appropriate, (B) to be used in accordance with the invention may also be accompanied by hydrophobic compounds which differ from the crosslinking agents. These hydrophobic compounds are also referred to by those in the art as costabilizers.

The hydrophobic compounds comprise water-insoluble substances which are polymers, oligomers or of low molecular mass. Examples of suitable hydrophobic compounds are esters of alpha,beta-monoolefinically unsaturated carboxylic acids, having 3 to 6 carbon atoms, with alcohols having 12 to 30 carbon atoms in the alkyl radical; esters of vinyl alcohol and/or allyl alcohol with alkanemonocarboxylic, -sulfonic and/or -phosphonic acids having 12 to 30 carbon atoms in the molecule; amides of alpha,beta-monoolefinically unsaturated carboxylic acids having 3 to 6 carbon atoms with alkylamines having 12 to 30 carbon atoms in the alkyl radical; macromonomers based on olefinically unsaturated compounds having on average at least one olefinically unsaturated group, in particular at least one terminal olefinically unsaturated group, in the molecule; polysiloxane macromonomers having on average at least one olefinically unsaturated group, in particular at least one terminal olefinically unsaturated group, in the molecule; oligomeric and/or polymeric products of addition polymerization, polycondensation and/or polyaddition; water-insoluble molecular weight regulators, especially mercaptans; aliphatic, cycloaliphatic and/or aromatic halogenated and/or nonhalogenated hydrocarbons; alkanols and/or alkylamines having at least 12 carbon atoms in the alkyl radical; organosilanes and/or organosiloxanes; vegetable, animal, semisynthetic and/or synthetic oils; hydrophobic dyes. Further examples of suitable hydrophobic compounds, or costabilizers, and the amounts in which they are advantageously used, are disclosed in German patent application DE 196 28 142 A1, page 4, lines 37 to 59.

Furthermore, the monomers (A) and also, where appropriate, (B) for inventive use may be (co)polymerized in the presence of emulsifiers and/or protective colloids. Examples of suitable emulsifiers and/or protective colloids and the amounts in which they are advantageously employed are disclosed in German patent application DE 196 28 142 A1, page 3, lines 8 to 48.

In terms of the molecular weight distribution, the (co)polymers formed from the monomers (A) and, where appropriate, (B) are not subject to any restrictions whatsoever. Advantageously, however, the (co)polymerization is conducted so as to result in a molecular weight distribution Mw/Mn, measured by gel permeation chromatography using polystyrene as standard, of $\leq 10$, with particular preference $\leq 7$, and in particular $\leq 4$.

Where the comonomers (B) are used as well, a further, additional advantage which results is in fact that the molecular weights of the copolymers can be controlled within wide limits by choosing the ratio of monomer (A) to monomer (B) to free-radical initiator. In this relationship, it is in particular the amount of monomer (B) which determines the molecular weight, specifically such that the higher the fraction of monomer (B) the lower the molecular weight obtained.

Suitable reactors for the (co)polymerization processes are the customary and known stirred tanks, stirred tank cascades, tube reactors, loop reactors or Taylor reactors, as described, for example, in the patents DE 1 071 241 B 1 or EP 0 498 583 A 1 or in the article by K. Kataoka in Chemical Engineering Science, Volume 50, No. 9, 1995, pages 1409 to 1416. The free-radical copolymerization is preferably conducted in stirred tanks or Taylor reactors, the Taylor reactors being configured such that the conditions of Taylor flow are met over the entire length of the reactor, even if the kinematic viscosity of the reaction medium alters greatly—in particular, increases—as a result of the copolymerization.

In accordance with the invention the copolymerization is conducted in an aqueous medium.

The aqueous medium essentially comprises water. The aqueous medium here may comprise, in addition to the crosslinking agents and also, where appropriate, hydrophobic compounds and/or emulsifiers and/or protective colloids, detailed above, customary and known coatings additives and/or other dissolved solid, liquid or gaseous, organic and/or inorganic substances of low and/or high molecular mass, provided these do not adversely affect, let alone inhibit, the (co)polymerization. For the purposes of the present invention a "minor amount" is an amount which does not remove the aqueous character of the aqueous medium.

Alternatively, the aqueous medium may simply consist of water.

The (co)polymerization is advantageously conducted at temperatures above room temperature, preference being given to the choice of a temperature range of from 30 to 95° C., with very particular preference from 40 to 90° C.

When using particularly volatile monomers (A) and, where appropriate, (B) the (co)polymerization may also be conducted under pressure, preferably under from 1.5 to 3000 bar, with particular preference from 5 to 1500 bar and, in particular, from 10 to 1000 bar. In specific cases, temperatures higher than 95° C. may be used.

In this context it proves a particular advantage of the process of the invention that it may also be carried out batchwise. Use may also be made, moreover, in this context of the regimes described in German patent application DE 196 28 142 A1, page 4, lines 6 to 36.

In accordance with the invention, the (co)polymerization is conducted in a microemulsion or miniemulsion, in particular a miniemulsion. In this case the average particle diameter of the emulsified monomer droplets is below 500 nm. It is preferably from 10 to 500 nm, more preferably from 50 to 400 nm, and with very particular preference from 100 to 350 nm. The said particle diameter is the so-called z-average particle diameter, which is determined by means of photon correlation spectroscopy in accordance with the principle of dynamic, quasielastic light scattering. For this purpose use may be made, for example, of a Coulter N4 Plus Particle Analyzer from Coulter Scientific Instruments or a PCS Malvern Zetasizer 1000. The measurement is normally made on an aqueous emulsion containing 0.01% by weight of the emulsified monomer droplets. The aqueous emulsion further comprises, in the aqueous phase, the corresponding monomers in dissolved form (up to the saturation), so that the emulsified monomer droplets do not break up.

The process of the invention may be performed so as to give the bimodal particle size distribution described above. Methods of producing bimodal particle size distributions are customary and known in the technological field in question here. It is preferred to use the seed method described in German patent application DE-A-196 28 142, page 5, lines 31 to 49.

The preparation of the miniemulsion as part of the process of the invention has no particular features as to method, but instead takes place in accordance with the customary and known methods of dispersing or emulsifying in a high shear field. Examples of suitable methods are described in the patents DE 196 28 142 A1, page 5, lines 1 to 30, DE 196 28 143 A1, page 7, lines 30 to 58, or EPO 401 565 A1, lines 27 to 51.

The primary dispersions of the invention are used to prepare the coating materials, adhesives and sealing compounds of the invention, or are used directly as such, which constitutes a major advantage of the primary dispersions of the invention.

Preferably they are used as coating materials of the invention, more preferably as surfacers, solid-color topcoats, aqueous basecoats and clearcoats, and in particular as clearcoats. For these end uses, at least one conventional and known paint additive in effective amounts may be added to the primary dispersions of the invention before, during and/or after their preparation. Before or during the preparation of the primary dispersions of the invention, the only paint additives added are those which do not disrupt, or even totally inhibit, the miniemulsion polymerization. The general technical knowledge of the skilled worker allows him or her to identify such paint additives. Preferably, the said paint additives are added after the preparation of the primary dispersions of the invention.

Examples of suitable paint additives are pigments, as described in Römpp Lexikon Lacke und Druckfarben, Georg Thieme Verlag, 1998, pages 176, "Effect pigments"; pages 380 and 381 "Metal oxide-mica pigments" to "Metal pigments"; pages 180 and 181, "Iron blue pigments" to "Black iron oxide"; pages 451 to 453, "Pigments" to "Pigment volume concentration"; page 563, "Thioindigo pigments"; and page 567, "Titanium dioxide pigments". Pigments are used when the coating materials of the invention are used as surfacers, solid-color topcoats or aqueous basecoats, but in particular as aqueous basecoats in the context of the so-called wet-on-wet technique (cf., for example, European patent EP 0 089 497 B1), to produce multicoat color and/or effect finishes. They are of course omitted if the coating materials of the invention are used as clearcoats, as part of the wet-on-wet technique, for example.

Further examples of suitable paint additives which can be used both in the pigmented coating materials and in the unpigmented coating materials are oligomeric and polymeric, thermally curable, linear and/or branched poly(meth)acrylates or acrylate copolymers of block, comb and/or random structure, especially those described in the patent DE 197 36 535 A1, polyesters, especially those described in the patents DE 40 09 858 A 1 or DE 44 37 535 A 1, alkyds, acrylated polyesters, polylactones, polycarbonates, polyethers, epoxy resin-amine adducts, (meth)acrylate diols, partially hydrolyzed polyvinyl esters, polyurethanes and acrylated polyurethanes, as described in the patents EP 0 521 928 A 1, EP 0 522 420 A 1, EP 0 522 419 A 1, EP 0 730 613 A 1 or DE 44 37 535 A 1, or polyureas.

Further examples of suitable additives are organic and inorganic fillers, thermally curable reactive diluents, low-boiling and/or high-boiling organic solvents ("long solvents"), UV absorbers, light stabilizers, free-radical scavengers, thermally labile free-radical initiators, aqueous dispersions of cocrosslinkers, crosslinking catalysts, devolatilizers, slip additives, polymerization inhibitors, defoamers, emulsifiers, wetting agents, adhesion promoters, leveling agents, film-forming auxiliaries, rheology control additives, biocides such as silver salts, or flame retardants.

Further examples of suitable paint additives are described in the textbook "Lackadditive" by Johan Bieleman, Wiley-VCH, Weinheim, N.Y., 1998.

If the coating materials of the invention are to be curable with actinic radiation as well (dual cure), they comprise additives curable with actinic radiation. Said actinic radiation may comprise electromagnetic radiation such as near infrared (NIR), visible light, UV light or X-rays, or corpuscular radiation such as electron beams. Examples of suitable additives curable with actinic radiation are known from German patent DE 197 09 467 C1.

The paint additives described above may also be present in the adhesives and sealing compounds of the invention, provided they are suitable for these applications, which is something the skilled worker may determine on the basis of his or her general knowledge in the art.

In terms of method, the application of the coating materials of the invention has no special features, but instead can be carried out by all customary application methods, such as spraying, knife coating, brushing, flow coating, dipping, trickle coating or roller coating, for example. It is preferred to use spray application methods, such as for example compressed air spraying, airless spraying, high-speed rotation, electrostatic spray application (ESTA), alone or in conjunction with hot spray application such as hot air spraying, for example.

Suitable coating substrates are all surfaces which are not damaged by curing of the coatings present on them with application of heat and, if appropriate, of actinic radiation; examples include metals, plastics, wood, ceramic, stone, textile, fiber composites, leather, glass, glass fibers, glass-wool and rockwool, mineral-bound and resin-bound building materials, such as plasterboards and cement boards or roof shingles, and also assemblies of these materials. Accordingly, the coating material of the invention is also suitable for applications outside of automotive finishing, especially in the coating of furniture or in industrial coating, including coil coating, container coating and the impregnation or coating of electrical components. In the context of industrial coatings, it is suitable for coating virtually all parts for private or industrial use, such as radiators, domestic appliances, small metal parts such as nuts and bolts, hub caps, wheel rims, packaging, or electrical components such as motor windings or transformer windings.

In the case of electrically conductive substrates it is possible to use primers produced in a customary and known manner from electrodeposition (ED) coating materials. Suitable for this purpose are both anodic (AED) and cathodic (CED) electrocoat materials, but especially CED. It is also possible to coat, bond or seal primed or unprimed parts made of plastics such as, for example, ABS, AMMA, ASA, CA, CAB, EP, UF, CF, MF, MPF, PF, PAN, PA, PE, HDPE, LDPE, LLDPE, UHMWPE, PC, PC/PBT, PC/PA, PET, PMMA, PP, PS, SB, PUR, PVC, RF, SAN, PBT, PPE, POM, PUR-RIM, SMC, BMC, PP-EPDM and UP (abbreviations in accordance with DIN 7728T1). Unfunctionalized and/or apolar substrate surfaces can be subjected to conventional treatment before coating, such as with a plasma or by flaming, or may be provided with an aqueous primer.

The method of curing the applied coating materials of the invention also has no special features, but instead takes place in accordance with the customary and known thermal methods such as heating in a forced air oven or irradiation with IR lamps, which in the case of dual cure may be supplemented by exposure to actinic radiation. In this context it is possible to use radiation sources such as high-pressure or low-pressure mercury vapor lamps, which may be doped with lead in order to open up a radiation window up to 405 nm, or electron beam sources.

The resultant coatings of the invention, especially the single-coat or multicoat color and/or effect paint or clearcoat finishes of the invention, are easy to produce and have outstanding optical properties and very high chemical resistance and weathering stability, even under extreme climatic conditions. They can therefore be used both inside and outdoors.

The adhesive films and seals of the invention that are produced from the adhesives and sealing compounds of the invention have outstanding bond strength and sealing capacity even under extreme climatic conditions and over long periods of time. They too may be used both inside and outdoors.

Consequently, the primed and unprimed substrates of the invention, particularly bodies of automobiles and commercial vehicles, industrial components, including plastics parts, packaging, coils and electrical components, or furniture, that have been coated with at least one coating of the invention, sealed with at least one seal of the invention and/or bonded with at least one adhesive of the invention are also distinguished by particular technical and economic advantages, especially a long service life, which makes them particularly attractive to users.

EXAMPLE

The Production of a Clearcoat System of the Invention

1. The Primary Dispersion of the Invention 200.3 parts by weight of a solid, 3,5-dimethylpyrazole-blocked, commercial polyisocyanate were dissolved with stirring, using a laboratory stirrer, in a solution composed of 99 parts by weight of methyl methacrylate, 118 parts by weight of n-butyl acrylate, 49.5 parts by weight of styrene, 106.6 parts by weight of hydroxypropyl methacrylate, 7.6 parts by weight of diphenylethylene and 19 parts by weight of 2,4-diethyloctane-1,5-diol. To the resulting homogeneous solution there were added with stirring 35.1 parts by weight of the commercial initiator Perkadox® 16S from Akzo Nobel Chemicals GmbH (bis(4-tert-butylcyclohexyl) peroxydicarbonate). There was then added to the resulting solution, with stirring, a solution of 16 parts by weight of the commercial emulsifier Abex® EP 110 from Rhone Poulenc Surfactants & Specialties in 848.9 parts by weight of deionized water. The preemulsion was first of all deispersed at 10,000 rpm for 30 seconds using an Ultraturrax and then converted into a fine miniemulsion (z-average particle size 215 nm as measured using a PCS Malvern Zetasizer 1000) by dispersing for 5 minutes using a pressure release homogenizer under a pressure of 200 bar.

2. The Polymerization of the Miniemulsion 1

The miniemulsion 1 was transferred to a 5 kg steel reactor and held at a constant temperature of 70° C. for one hour. The resulting miniemulsion copolymer had a solids content of 40.1% by weight (30 minutes/130° C.) and a z-average particle size of 247 nm (measured using a PCS Malvern Zetasizer 1000). It was completely free from coagulum and was stable to sedimentation.

3. The Clearcoat Material of the Invention

The miniemulsion copolymer 2 was adjusted to spray viscosity by adding 22.5 parts by weight of the commercial thickener Collacral® VL from BASF Aktiengesellschaft and 15 parts by weight of the commercial leveling agent Byk® 348 from Byk Chemie GmbH.

4. The Clearcoat System of the Invention

The clearcoat material 3 was applied pneumatically to test panels which had been coated with an electrocoat prepared from a commercial cathodic electrocoat material from BASF Coatings AG (Cathoguard®), a 13 μm surfacer coat prepared from a commercial aqueous surfacer from BASF Coatings AG (Ecoprime®), and a 14 μm color and effect basecoat, prepared from a commercial aqueous basecoat material from BASF Coatings AG (Ecostar®); the resulting clearcoat film was flashed off at room temperature for 5 minutes and at 80° C. for 10 minutes and then baked at a panel temperature of 150° C. for 30 minutes. The result was a multicoat paint system of the invention, comprising a clearcoat which was 57 μm thick and free from popping marks, which exhibited very good leveling and a very good overall appearance:

4.1 Waviness

The waviness of the clearcoat of the invention was measured by means of the wavescan method. For this purpose, a laser beam was directed onto the surface at an angle of 60° and the fluctuations in the reflected light were recorded using a measuring instrument over a measurement length of 10 cm.

In the so-called longwave region (0.6 to 10 mm; observation distance: 2.5 m) a value of 10.4 was found. Accordingly, there were effectively no orange peel structures or other defects present in the coating.

In the so-called shortwave region (0.1 to 0.6 mm; observation distance: 45 cm) a value of 45.9 was found. Accordingly, any fine structures of this order of magnitude present in the surface were few in number, if indeed present at all.

4.2 Gloss and Haze

Gloss and haze were measured by reflectometry at an angle of 20° using a Byk reflectometer. The clearcoat of the invention had a gloss of 82.7 and a haze of 50.6 and so met the requirements of the art in this respect as well.

What is claimed is:

1. An aqueous primary dispersion comprising a polymer having a diameter ≦500 nm comprising a controlled free-radical microemulsion or miniemulsion polymerization product of at least one olefinically unsaturated monomer (A) in the presence of at least one polyhydroxy-functionalized alkane having from 9 to 16 carbon atoms in the molecule, wherein the alkane is at least one of a cyclic alkane and an acyclic alkane, and wherein the polymer is at lease one of a dispersed solid polymer particle, an emulsified solid polymer particle, a dispersed liquid polymer particle, an emulsified liquid polymer particle, and a dispersed solid core-shell particle.

2. The aqueous primary dispersion of claim 1, wherein the alkane is functionalized with two hydroxyl groups.

3. The aqueous primary dispersion of claim 1, wherein the polyhydroxy-functionalized alkane is acyclic.

4. The aqueous primary dispersion of claim 1, wherein the polyhydroxy-functionalized alkane contains at least one of a primary hydroxyl group and a secondary hydroxyl group.

5. The aqueous primary dispersion of claim 1, the polyhydroxy-functionalized alkane is a positionally isomeric dialkyloctanediol.

6. The aqueous primary dispersion of claim 5, wherein the positionally isomeric dialkyloctanediol is a positionally isomeric diethyloctanediol.

7. The aqueous primary dispersion of claim 6, wherein the positionally isomeric diethyloctanediol is one of a 2,3-, 2,4-, 2,5-, 2,6-, 2,7-, 3,4-, 3,5-, 3,6-, or -4,5-diethyloctanediol.

8. The aqueous primary dispersion of claim 7, wherein the positionally isomeric diethyloctanediol is a 2,4-diethyloctanediol.

9. The aqueous primary dispersion of claim 6, wherein the positionally isomeric diethyloctanediol is one of a diethyloctane-1,2-, -1,3-, -1,4-, -1,5-, -1,6-, -1,7-, -1,8-, -2,3-, -2,4-, -2,5-, -2,6-, -2,7-, -2,8-, -3,4-, -3,5-, -3,6-, -3,7-, -3,8-, -4,5-, 4,8-, -5,6-, -5,7-, -5,8-, -6,7-, -6,8-, or -7,8-diol.

10. The aqueous primary dispersion of claim 9, wherein the positionally isomeric diethyloctanediol is a diethyloctane-,1,5-diol.

11. The aqueous primary dispersion of claim 10, wherein the positionally isomeric diethyloctanediol is 2,4-diethyloctane-1,5-diol.

12. The aqueous primary dispersion of claim 1, wherein the olefinically unsaturated monomer (A) is copolymerized with at least one olefinically unsaturated monomer (B) that is different than (A) and is of the general formula I $$R^1R^2C=CR^3R^4 \qquad (I)$$

wherein $R^1$, $R^2$, $R^3$, and $R^4$ are each independently one of a hydrogen atom, an unsubstituted alkyl radical, an unsubstituted cycloalkyl radical, an unsubstituted alkylcycloalkyl radical, an unsubstituted cycloalkylalkyl radical, an unsubstituted aryl radical, an unsubstituted alkylaryl radical, an unsubstituted cycloalkylaryl radical, an unsubstituted arylalkyl radical, an unsubstituted arylcycloalkyl radical, a substituted alkyl radical, a substituted cycloalkyl radical, a substituted alkylcycloalkyl radical, a substituted cycloalkylalkyl radical) a substituted aryl radical, a substituted alkylaryl radical, a substituted cycloalkylaryl radical, a substituted arylalkyl radical, and a substituted arylcycloalkyl radical, with the proviso that at least two of $R^1$, $R^2$, $R^3$, and $R^4$ are at least one of an unsubstituted aryl radical, an unsubstituted arylalkyl radical, an unsubstituted arylcycloalkyl radical, a substituted aryl radical, a substituted arylalkyl radical, and a substituted arylcycloalkyl radical.

13. The aqueous primary dispersion of claim 1, wherein the free-radical mirocemulsion or miniemulsion polymerization product is prepared in the presence of at least one hydrophobic crosslinking agent for the (co)polymer resulting from the olefinically unsaturated monomer (A).

14. The aqueous primary dispersion of claim 12, wherein the free-radical microemulsion or miniemulsion polymerization product is prepared in the presence of at least one hydrophobic crosslinking agent for the copolymer resulting from the olefinically unsaturated monomer (A) and the olefinically unsaturated monomer (B).

15. The aqueous primary dispersion of claim 1, wherein the dispersed particles are core-shell particles comprising cores of organic solids and shells of polymers comprising at least one olefinically unsaturated monomer (A).

16. The aqueous primary dispersion of claim 1, wherein the dispersed particles are-core-shell particles comprising cores organic solids and shells of polymers comprising at least one olefinically unsaturated monomer (A).

17. The aqueous primary dispersion of claim 12, wherein the dispersed particles are core-shell particles comprising cores of organic solids and shells of polymers comprising at least one olefinically unsaturated monomer (A) and at least one olefinically unsaturated monomer (B) in copolymerized form.

18. The aqueous primary dispersion of claim 1, wherein the cores of the core-shell particles are prepared by one of free-radical microemulsion polymerization and miniemulsion free-radical polymerization.

19. A composition prepared from the aqueous primary dispersion of claim 1, wherein the composition is one of a coating material, an adhesive, and a sealing compound.

20. The composition of claim 19, wherein the coating material is one of an automotive OEM finish, an automotive refinish, a furniture coating, arm industrial coating, a coil coating, a container coating, and an electrical component coating.

21. A process for preparing the aqueous primary dispersion of claim 1 comprising controlled free-radical microemulsion or miniemulsion polymerizing at least one olefinically unsaturated monomer (A) in the presence of at least one polyhydroxy-functionalized alkane.

22. The process of claim 21, wherein the alkane is functionalized with two hydroxyl groups.

23. The process of claim 21, wherein the polyhydroxy-functionalized alkane is acyclic.

24. The process of claim 21, wherein the polyhydroxy-functionalized alkane contains at most one of a primary hydroxyl group and a secondary hydroxyl group.

25. The process of claim 21, wherein the polyhydroxy-functionalized alkane positionally isomeric dialkyloctanediol.

26. The process of claim 25, wherein the positionally isomeric dialkyloctanediol is a positionally isomeric diethyloctanediol.

27. The process of claim 26, the positionally isomeric diethyloctanediol is one of a 2,3-, 2,4-, 2,5-, 2,6-, 2,7-, 3,4-, 3,5-, 3,6-, or -4,5-diethyloctanediol is one of a 2,3-, 2,4-, 2,5-, 2,6-, 2,7-, 3,4-, 3,5-, 3,6-, or 4,5-diethyloctanediol.

28. The process of claim 27, wherein the positionally isomeric diethyloctanediol is a 2,4-diethyloctanediol.

29. The process of claim 25, wherein the positionally isomeric diethyloctanediol is one of a diethyloctane-2-, 1,3-, -1,4-, -1,5-, -1,6-, -1,7-, -1,8-, -2,3-, -2,4-, -2,5-, -2,6-, -2,7-, -2,8-, -3,4-, -3,5-, -3,6-, -3,7-, -3,8-, -4,5-, -4,6- -4,7- -4,8-, -5,6-, -5,7-, -5,8-,-6,7-, -6,8-, or -7,8-diol.

30. The process of claim 29, wherein the positionally isomeric diethyloctanediol is a diethyloctane-1,5-diol.

31. The process of claim 30, wherein the positionally isomeric diethyloctanediol is 2,4diethyloctane-1,5-diol.

32. The process of claim 21, wherein the olefinically unsaturated monomer (A) is copolymerized with at least one olefinically unsaturated monomer (B) that is different than (A) and is of the general formula I $$R^1R^2C=CR^3R^4 \qquad (I)$$

wherein $R^1$, $R^2$, $R^3$, and $R^4$ are each independently one of a hydrogen atom, an unsubstituted alkyl radical, an unsubstituted cycloalkyl radical, an unsubstituted alkylcycloalkyl radical, an unsubstituted cycloalkylalkyl radical, an unsubstituted aryl radical, an unsubstituted alkylaryl radical, an unsubstituted cycloalkylaryl radical, an unsubstituted arylalkyl radical, an unsubstituted arylcycloalkyl radical, a substituted alkyl radical, a substituted cycloalkyl radical, a substituted alkylcycloalkyl radical, a substituted cycloalkylalkyl radical, a substituted aryl radical, a substituted alkylaryl radical, a substituted cycloalkylaryl radical, a substituted arylalkyl radical, and a substituted arylcycloalkyl radical, with the proviso that at least two of $R^1$, $R^2$, $R^3$, and $R^4$ are at least one of an unsubstituted aryl radical, an unsubstituted arylalkyl radical, an unsubstituted arylcycloalkyl radical, a substituted aryl radical, a substituted arylalkyl radical, and a substituted arylcycloalkyl radical.

33. The process of claim 21, wherein the free-radical microemulsion or miniemulsion polymerizing further comprises polymerizing in the presence of at least one hydrophobic crosslinking agent for the (co)polymer resulting from the olefinically unsaturated monomer (A).

34. The process of claim 32, wherein the free-radical microemulsion or miniemulsion polymerizing further comprises polymerizing in the presence of at least one hydrophobic crosslinking agent for the copolymer resulting from the olefinically unsaturated monomer (A) and the olefinically unsaturated monomer (B).

35. The process of claim 21, wherein the dispersed particles are core-shell particles comprising cores of organic solids and shells of polymers comprising at least one olefinically unsaturated monomer (A).

36. The process of claim 32, wherein the dispersed particles are core-shell particles comprising cores of organic solids and shells of polymers comprising at least one olefinically unsaturated monomer (A) and at least one olefinically unsaturated monomer (B) in copolymerized form.

37. The process of claim 21, wherein the cores of the core-shell particles are prepared by one of free-radical microemulsion polymerization and miniemulsion free-radical polymerization.

38. The process of claim 21 comprising forming one of a coating material, an adhesive, and a sealing compound from the aqueous primary dispersion.

39. The process of claim 38, wherein the coating material is one of an automotive OEM finish, an automotive refinish, a furniture coating, an industrial coating, a coil coating, a container coating, and an electrical component coating.

* * * * *